United States Patent [19]
Pashan et al.

[11] Patent Number: 5,278,969
[45] Date of Patent: Jan. 11, 1994

[54] QUEUE-LENGTH MONITORING ARRANGEMENT FOR DETECTING CONSISTENCY BETWEEN DUPLICATE MEMORIES

[75] Inventors: Mark A. Pashan; Ronald A. Spanke, both of Wheaton, Ill.

[73] Assignee: AT&T Bell Laboratories, Murray Hill, N.J.

[21] Appl. No.: 739,928

[22] Filed: Aug. 2, 1991

[51] Int. Cl.$^5$ ............................................. G06F 11/16
[52] U.S. Cl. ................... 395/425; 364/285.3; 364/268.9; 364/944.2; 364/944.3; 364/944.61; 364/966.5; 364/966.6
[58] Field of Search ............ 364/200; 395/425; 371/9.1; 365/189.01

[56] References Cited

U.S. PATENT DOCUMENTS

| | | | |
|---|---|---|---|
| 3,810,119 | 5/1974 | Zieve et al. | 340/172.5 |
| 3,864,670 | 2/1975 | Inoue et al. | 340/172.5 |
| 4,577,274 | 3/1986 | Ho et al. | 364/200 |
| 4,736,339 | 4/1988 | Crabbe, Jr. | 364/900 |
| 4,866,661 | 9/1989 | de Prins | 364/900 |
| 4,916,704 | 4/1990 | Bruckert et al. | 371/68.3 |
| 4,930,106 | 5/1990 | Danilenko et al. | 365/189.01 |
| 5,072,440 | 12/1991 | Isono et al. | 370/60 |
| 5,097,409 | 3/1992 | Schwartz et al. | 395/425 |
| 5,099,485 | 3/1992 | Bruckert et al. | 371/68.3 |
| 5,126,889 | 6/1992 | Walden | 360/53 |
| 5,136,595 | 8/1992 | Kimura | 371/68.3 |
| 5,136,704 | 8/1992 | Danielsen et al. | 395/575 |
| 5,157,663 | 10/1992 | Major et al. | 371/9.1 |

FOREIGN PATENT DOCUMENTS 9104624  4/1991  World Int. Prop. O. .

OTHER PUBLICATIONS

L. E. Gallaher et al., "The fault–tolerant 3B–20 Processor" *1981 National Computer Conference*, AFIPS Conf. Proceedings (May 4–7, 1981) pp. 42–48.

Primary Examiner—Joseph L. Dixon
Assistant Examiner—B. James Peikari
Attorney, Agent, or Firm—David Volejnicek

[57] ABSTRACT

A shared-buffer-memory-based asynchronous transfer mode (ATM) switch module (1) is duplicated (2) and operates in active-standby mode for fault-tolerance. Following failure and repair of a module, contents of the two modules are resynchronized as follows. When the synchronizing operation is begun contents of the memory of the repaired standby module are cleared, all writes to the active module's memory are also made to the standby module's memory, and the system monitors the overwriting of the contents of the active module's memory that existed at the time the synchronizing commences. This is done by a function (FIG. 4), which sets a flat (64) in a queue-length-counter monitor (60) for every active-module queue-length counter (200) that reaches a count of zero, to indicate that its corresponding buffer-memory queue (100) has been emptied. When all monitor flags have been set in response to each queue-length counter having reached a count of zero, this indicates that the original contents of the active module's memory have been overwritten and that the memories again have identical contents, and consequently that resynchronization of the two memories has been achieved and fault-tolerance has been re-established.

24 Claims, 3 Drawing Sheets

QUEUE-LENGTH MONITORING ARRANGEMENT FOR DETECTING CONSISTENCY BETWEEN DUPLICATE MEMORIES

TECHNICAL FIELD

This invention relates generally to fault-tolerance arrangements that use duplicated, active-standby, units, and relates specifically to duplicated-memory arrangements.

BACKGROUND OF THE INVENTION

A common way of achieving fault-tolerance in computer and telecommunications systems is to duplicate the fault-prone unit and operate the system with one of the duplicate units active and performing system tasks, while the other duplicate unit is either inactive or operating in lock-step with the active unit and standing by to take over the performance of system tasks upon the failure the active unit. For example, in telephony switching systems, it is common to duplicate the switching fabric and/or the system control computer (including the computer memory and its contents) and to operate the duplicate units in active-standby mode.

In the case of duplicate, active-standby, memories, proper system operation requires that the contents of the memories be identical. Initially, this is achieved by loading the same contents into both duplicate memories at initialization. During system operation, synchronization of the duplicate memory contents is maintained by performing all write operations on both memories, so that the duplicate contents of both memories change identically.

During system operation, following a failure of the active memory, substitution therefor of the standby memory, and repair of the formerly-active memory, it is necessary to bring the repaired, now standby, memory into synchronism with the now active memory in order to again achieve fault-tolerance. This requires the contents of the two memories to again become, and to remain, identical. This means that the repaired memory must be populated with the contents of the active memory. In the prior art, population of the standby memory with contents of the active memory is achieved by serially reading the contents out of the active memory and writing the read-out contents into the standby memory, and in the meantime also writing into the standby memory any changes being made to those contents of the active memory that have already been copied into the standby memory. An illustrative system of this type is disclosed in U.S. Pat. No. 3,864,670.

This scheme for achieving synchronism between duplicate memories has disadvantages, however. On the one hand, if the system processor is used to copy the contents of the active memory into the standby memory, processing power for this job is taken away from system tasks, and system performance is adversely affected. On the other hand, if a separate controller is provided to perform the copying, or if the memories perform the copying operation autonomously, between system-processor accesses of the active memory, it may take a long time to achieve memory synchronization, particularly in systems that are performing memoryintensive tasks. But the system is not fault-tolerant without memory synchronization, making it imperative to achieve synchronization as soon as possible.

SUMMARY OF THE INVENTION

This invention is directed to solving these and other disadvantages of the prior art. According to the invention, when the synchronizing of an active and a standby memory begins, all subsequent writes to the active memory are duplicated on the standby memory (which is, illustratively, empty), and overwriting of the then-present contents of the active memory is monitored. Illustratively, in a memory that serves to buffer data in queues, a queue-length counter is associated with each queue of the active memory, and the system monitors the counters for when they reach a count of zero. Once it has been found that all of the original contents of the active memory have been overwritten—illustratively, when each queue-length counter has reached a count of zero at least once—this is an indication that synchronization of the two memories has been achieved and that their contents are identical. At this point, the standby memory can again be substituted for the active memory to achieve faulttolerance.

In a variation of this embodiment, a single queue-length counter is associated with the plurality of queues of the active memory and keeps track of the total contents of all of the queues. When the synchronization beings, this counter begins to monitor the queue contents—illustratively only the then-present contents. Once this counter reaches a count of zero, this is an indication that synchronization has been achieved.

The invention has numerous advantages over the prior art. It does not take processing power of the system processor away from system tasks for memory-copying purposes, and hence it does not adversely impact system performance. Nor does it require the expense of having a separate processor for memory-synchronization purposes. Rather, it accomplishes synchronization of the active and standby memories merely through normal use of the memory for its intended application. Yet is accomplishes memory synchronization—and hence return to fault-tolerance - - rapidly in memory-intensive applications where turnover of the memory contents is frequent. Such applications include: buffer-memory-based switching-fabric architectures, which are gaining prominence in Asynchronous Transfer Mode (ATM) systems for providing broadband ISDN (BISDN) services; duplicated FIFOS, which can be monitored for when the active FIFO empties; and processor stacks, which can be monitored for when the active processor's stack depth becomes zero.

These and other advantages and features of the invention will become more apparent from the following description of an illustrative embodiment of the invention taken together with the drawing.

DETAILED DESCRIPTION

Figure 1:
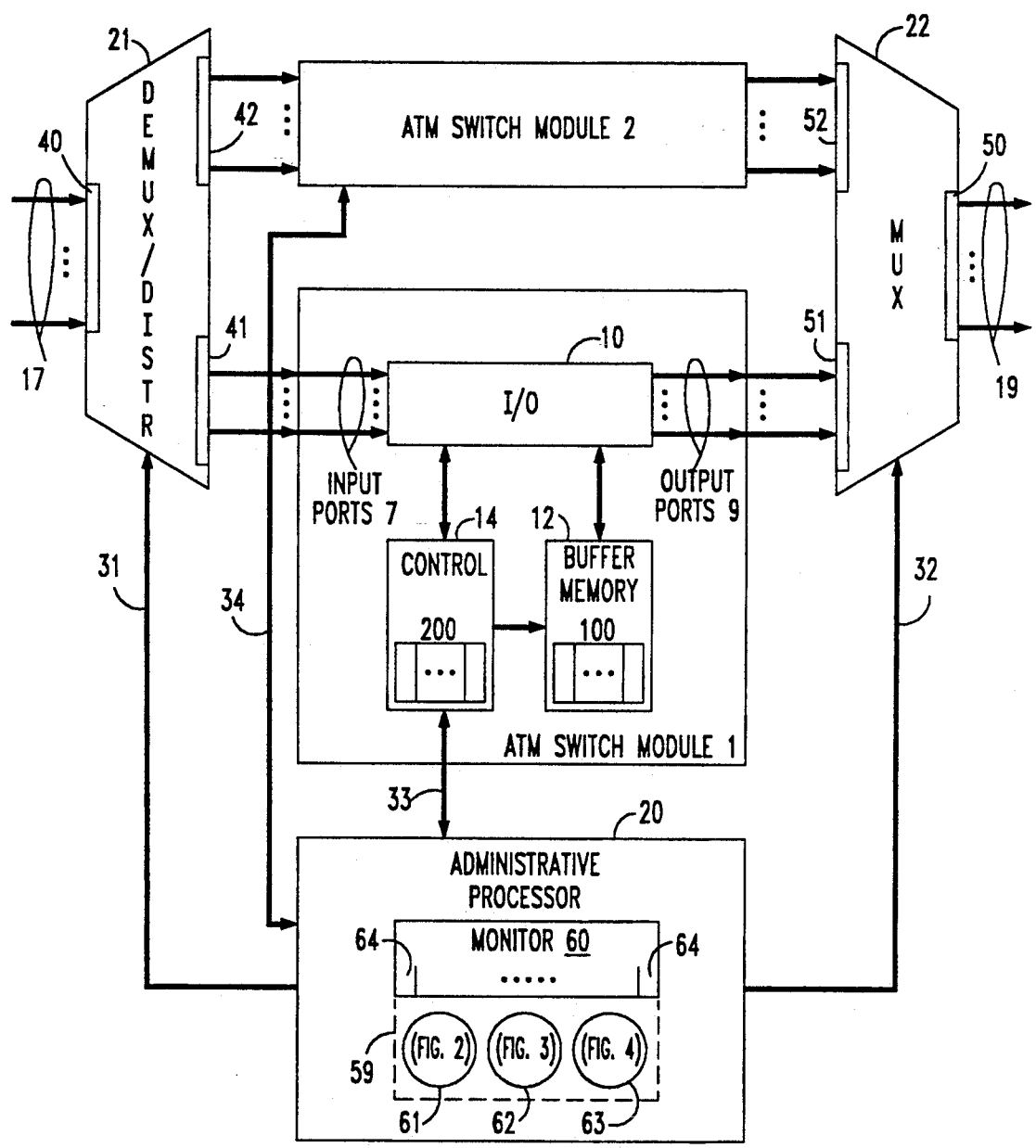
FIG. 1 is a block diagram of a communications switching arrangement that includes an illustrative embodiment of the invention.

FIG. 1 shows in block diagram form a communications switching arrangement that includes an illustrative embodiment of the invention. The arrangement shown in FIG. 1 is a part of an Asynchronous Transfer Mode (ATM) switching and transmission system. It constitutes either a stand-alone switch of that system or a portion of a switch made up of a plurality of such portions. The arrangement constitutes a duplicate pair of ATM switch modules 1 and 2, which are arranged to operate in active-standby mode for fault-tolerance purposes.

Modules 1 and 2 are connected in parallel to separate output ports 41 and 42, respectively, of a demultiplexer/distributor (DEMUX/DISTR) 21, and to separate input ports 51 and 52, respectively, of a multiplexer (MUX) 22. Both devices 21 and 22 are of conventional design and function. DEMUX/DISTR 21 has an input port 40 connected to one or more input links 17. It connects its input port 40, and thereby connects input links 17, either to output port 41 or 42 to provide a demultiplexing selection function or to both output ports 41 and 42 to provide a distribution (i.e., a broadcast) function. MUX 22 has an output port 50 connected to a plurality of output links 19. It connects its output port 50, and thereby connects output links 19, to either input port 51 or 52 to provide a multiplexing selection function.

DEMUX/DISTR 21 and MUX 22 operate under control of an administrative processor 20. Switch administrative processors are well known in the art. Processor 20 controls the input-port-to-output-port interconnections of DEMUX/DISTR 21 and MUX 22 via control links 31 and 32, respectively. Additionally, processor 20 is in communication with ATM switch modules 1 and 2 through control links 33 and 34, respectively.

FIG. 1 also shows in block form the internal construction of a sharedbuffer-memory-based ATM switch module 1; module 2 is constructed identically. Such switches are well known in the an. An illustrative example thereof is disclosed in WO 91/04624, which is hereby incorporated herein by reference. Module 1 comprises one or more input ports 7 over which module 1 receives incoming ATM cells. Input ports 7 are connected to input and output circuitry (I/O) 10, which couples input ports 7 to a control 14, a buffer memory 12, and to output ports 9. I/O 10 illustratively comprises phase-alignment circuitry, serial-to-parallel and parallel-to-serial shift registers, and multiplexers and demultiplexers. Copies of header portions of incoming ATM cells received from input ports 7 are sent by I/O 10 to control 14, and the cells are sent by I/O 10 to buffer memory 12 for storage.

Buffer memory 12 comprises one or more RAMs that illustratively implement one or more queues 100 for each output port. For every individual one of the output ports 9, buffer memory 12 provides a separate queue 100 for each one of the ATM cell priorities.

Control 14 controls storage of incoming ATM cells in buffer memory 12 and transmission of stored ATM cells at output ports 9. Control 14 illustratively comprises a queue processor, a pointer RAM, an output-port counter, and queue-length counters 200. Counters 200 include one counter 200 for each queue 100.

Based on the header of an incoming ATM cell, received from I/O 10, control 14 determines the priority and the destination output port of that cell, causes the cell to be stored in the corresponding queue 100 in buffer memory 12, and increments that queue's corresponding counter 200. Control 14 also periodically accesses the highest-priority non-empty queue 100 of the one of the output ports 9 that is identified by the present count of the output-port counter, retrieves therefrom an ATM cell that is at the head of the queue, decrements that queue's corresponding counter 200, and causes I/O 10 to transmit the retrieved cell on the corresponding one of the output ports 9.

According to the invention, administrative processor 20 includes a queue-length-counter monitor 60, and a plurality of fault-tolerance-related routines or functions 61–63. Monitor 60 is illustratively nothing more than a register or a memory word that has a flag bit 64 for each queue-length counter 200 of a switch module. Its use is explained further below. Functions 61–63 are illustratively implemented as instructions stored in a read-only memory 59 which processor 20 executes when called upon to do so. Alternatively, functions 61–63 can be implemented as hard-wired circuits. The operational features of functions 61–63 are diagramed in flowchart form in FIGS. 2–4, respectively.

Alternatively, an individual counter 200 keeps count of the sum of the contents of a plurality of queues 100. For example, a single counter 200 may be used to monitor the contents of all queues 100. In this latter case, monitor 60 becomes superfluous.

Figure 2:
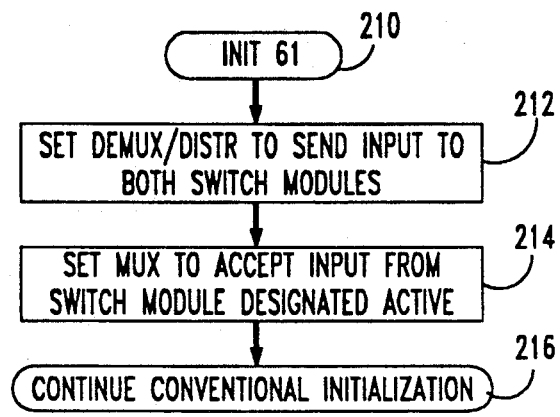
FIG. 2 is a flow diagram of an INITialization function of the administrative processor of the arrangement of FIG. 1.

Turning to FIG. 2, upon initialization of the arrangement of FIG. 1, INIT function 61 is invoked at step 210, and executed. In response, it causes DEMUX/DISTR 21 to connect its input port 40 to both output ports 41 and 42, at step 212, thereby to perform a distribution function and to send any ATM cells received on any input links 17 to corresponding input ports 7 of both ATM switch modules 1 and 2. Function 61 also causes MUX 22 to connect its output port 50 to the one of input ports 51 or 52 which is connected to the one of modules 1 and 2 which is designated as the active module, at step 214. In consequence, ATM cells appearing at output ports 9 of only the active module 1 or 2 will be transmitted on the corresponding ones of output links 19. Illustratively, processor 20 obtains the information on which one of modules 1 and 2 is designated as the active module as input from an administrator's terminal (not shown). Function 61 then continues with the performance of conventional system initialization tasks, at step 216. These tasks include either resetting (i.e., zeroing out) the contents of both memories 12 or loading both memories 12 with identical initial contents.

When the arrangement of FIG. 1 is active, both modules 1 and 2 perform identical operations. Due to the activities performed by WIT function 61, both modules 1 and 2 receive the identical inputs, and use them to keep the contents of their buffer memories 12 synchronized. When one of modules 1 and 2 fails, it either reports that fact autonomously to processor 20, or processor 20 discovers that fact through periodic maintenance activities (e.g., tests) that it performs on modules 1 and 2.

Figure 3:
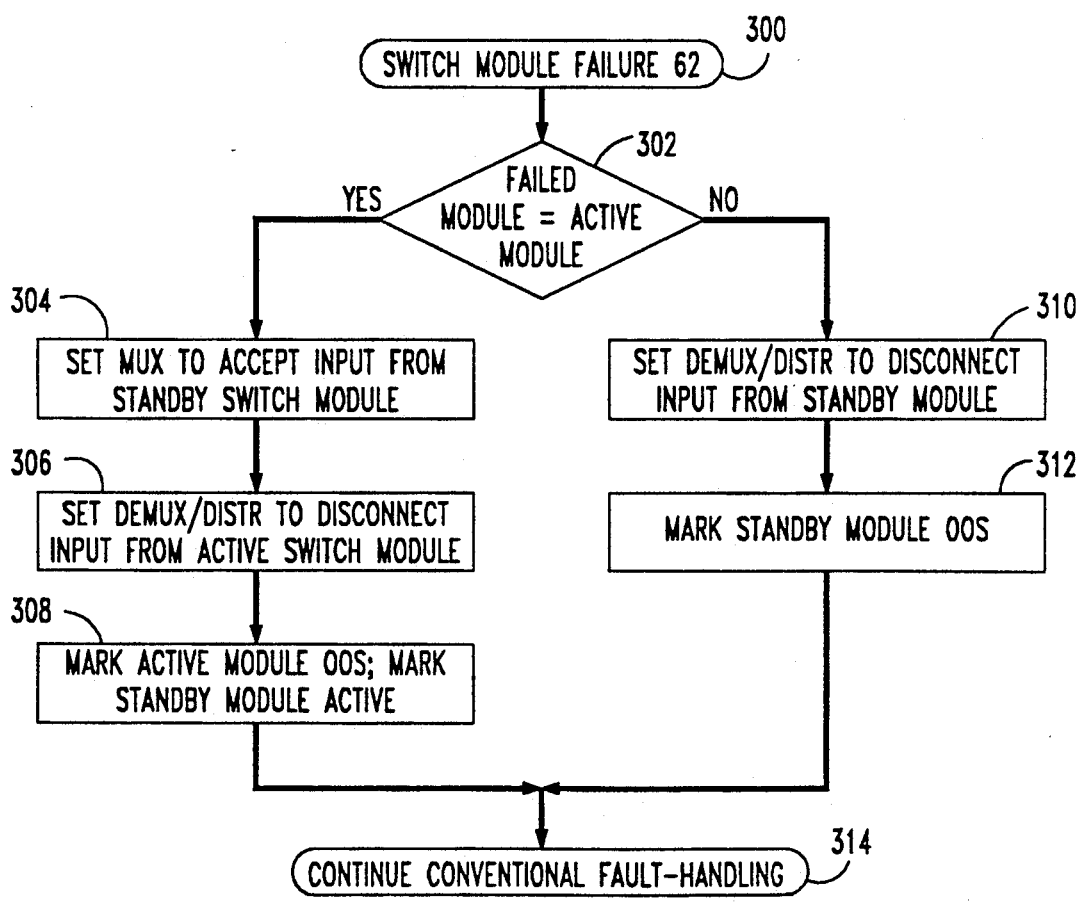
FIG. 3 is a flow diagram of a switch module failure-handling function of the administrative processor of the arrangement of FIG. 1.

When processor 20 detects a failure of one of the modules 1 or 2, function 62 of FIG. 3 is invoked, at step 300. Function 62 first determines whether the failed module is the active or the standby module, at step 302. If the active module failed, function 62 causes MUX 22 to connect its output port 50 to the one of input ports 51 and 52 which is connected to the standby module, at step 304, thereby disconnecting the failed module from output links 19 and isolating the failed module. Function 62 also causes DEMUXIDISTR 21 to disconnect its input port 40 from to the one of output ports 41 and 42 which is connected to the failed module, at step 306, thereby disconnecting the failed module form input links 17. Function 62 then designates the standby module as the active module; and designates the failed module as being out-of-service (OOS), at step 308. Function 62 then continues with the performance of conventional fault-handling activities, at step 314.

Returning to step 302, if the failed module is the standby module, function 62 causes DEMUX/DISTR 21 to disconnect its input port 40 from the one of output ports 41 and 42 which is connected to the failed module, at step 310. Function 62 then designates the failed standby module as being out-of-service, at step 312, and then continues with the performance of conventional fault-handling activities, at step 314.

Figure 4:
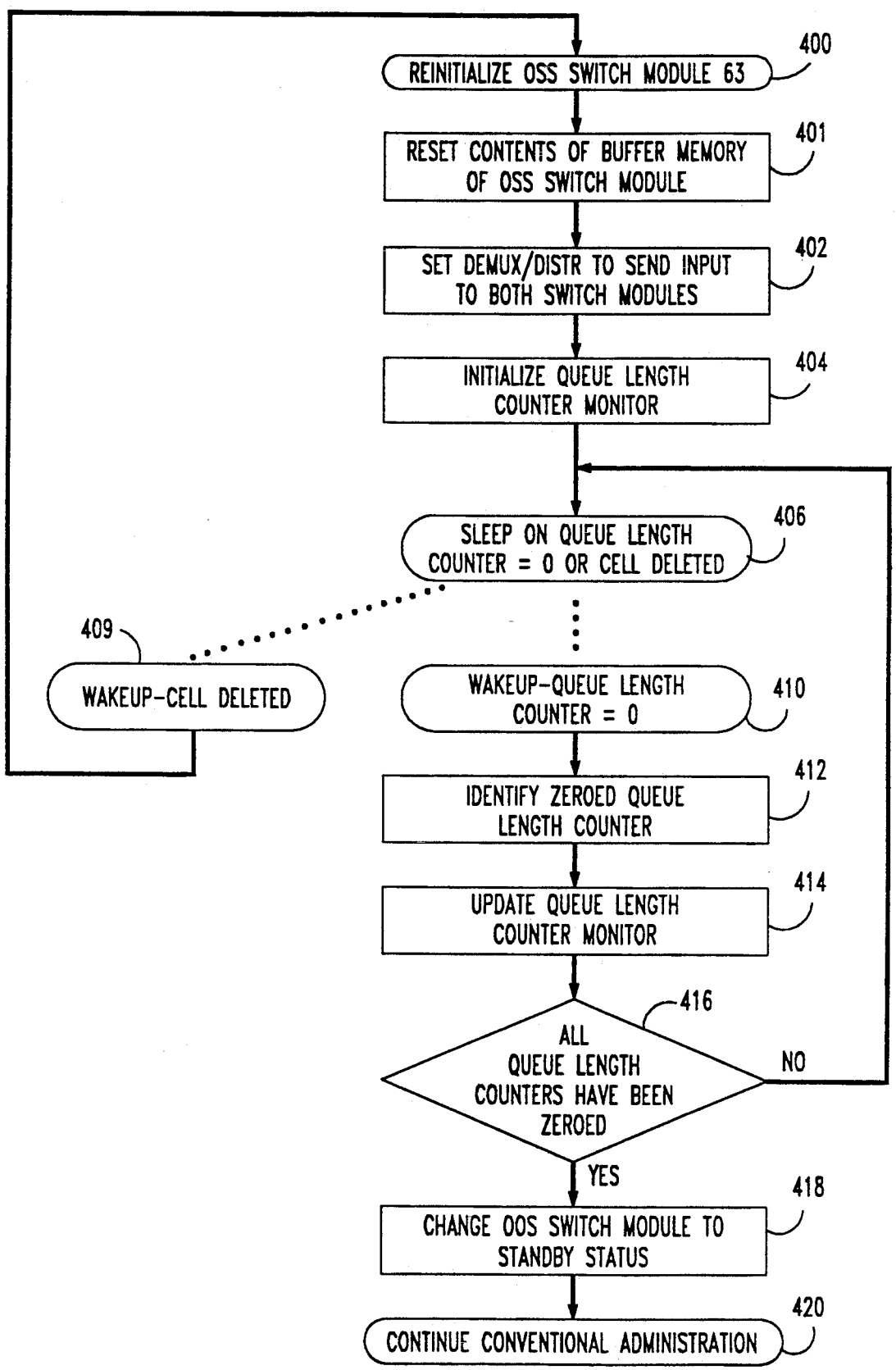
FIG. 4 is a flow diagram of a failed switch module reinitialization function of the administrative processor of the arrangement of FIG. 1.

When the faulty one of modules 1 and 2 has been repaired (i.e., the fault has been identified and removed), processor 20 is informed, for example again by input from an administrator's terminal. In response, function 63 of FIG. 4 is invoked, at step 400. In response, function 63 resets (i.e., zeroes out) the contents of buffer memory 12 of the repaired module, at step 401. Function 63 then causes DEMUX/DISTR 21 to again connect its input port 40 to both output ports 41 and 42, at step 402, thereby causing both modules 1 and 2 to commence receiving the same input. However, the contents of buffer memory 12 of the repaired module are at this time not the same as the contents of buffer memory 12 of the active module—buffer memory 12 of the repaired module is empty. But the identical set of activities henceforth performed by both modules 1 and 2, combined with the identical changes being made to contents of both buffer memories 12 as a consequence of step 402, will eventually synchronize the contents of both buffer memories 12. To determine when synchronization has occurred, function 63 uses queue-length counters 200 of the active one of the modules 1 and 2 and queue-length-counter monitor 60. Function 63 initializes monitor 60, illustratively by zeroing its contents, at step 404. Function 63 then goes to sleep to await either the count of a counter 200 of the active module reaching zero or a buffer-overflow condition that results in deletion of a cell from buffer memory 12 of the active one of the modules 1 and 2, at step 406.

Various schemes are known for controlling overflow of buffer memory 12 or individual ones of its queues 100. The typical result of these schemes is the discarding either of the newly-arriving cell that results in the overflow or of a cell that is already stored in a queue 100 to make room for the newly-arriving cell. Because buffer memory 12 of the active module typically starts out at step 401 with more contents than buffer memory 12 of the standby module, prior to buffer memory synchronization being achieved the overflow condition and resultant cell deletion typically occurs only at the active module a-nd not at the standby module. The cell deletion therefore typically destroys the synchronization requirement that identical changes be made to the contents of buffer memories 12 of both modules 1 and 2. Therefore, upon the deletion of a cell from buffer memory 12 of the active module, control 14 of the active module notifies processor 20. This notification causes function 63 to awaken, at step 409, and to return to step 400 to start anew the process of memory content synchronization.

Considering momentarily FIG. 1, when a queue 100 of the active module becomes empty, the count of its corresponding counter 200 reaches 0, and control 14 notifies processor 20. Returning to FIG. 4, this causes function 63 to awaken, at step 410. Function 63 determines which one of counters 200 of the active module was the cause of its awakening, at step 412, and then updates monitor 60 with that information, at step 414, by setting that counter's corresponding flag 64 in monitor 60. Function 63 then checks whether any flags 64 in monitor 60 remain cleared, at step 416. If any flags 64 do remain cleared, it means that their corresponding counters 200 of the active module have not reached a count of zero, and consequently that those counter's corresponding queues 100 have not been emptied since monitor 60 was initialized at step 404. Function 63 therefore returns to step 406.

If however, all flags 64 within monitor 60 are found at step 416 to have been set, it means that all contents of buffer memory 12 of the active module have been cleared out of buffer memory 12 since step 404, and hence that the contents of buffer memories 12 are now synchronized. This means that the repaired module is ready to assume a standby role to the active module. Function 63 therefore changes the status designation of the repaired module from out-of-service to standby, at step 418. Function 63 then continues with the performance of conventional administrative activities, at step 420.

Of course, it should be understood that various changes and modifications to the illustrative embodiment described above will be apparent to those skilled in the art. For example, in an environment where all ATM cells are of the same priority, a buffer memory may implement only one queue per output port. Also, the queued items need not be ATM cells, but may be other communications, including other packet types. Furthermore, monitoring memory-content clearing need not be performed on a per-queue basis, but may be done on the basis of any other memory sub-entity, such as a memory sector, block, word, or even byte. Additionally, in systems that utilize "idle" communications (e.g., idle code or idle packets) when no "real" communications are available, contents of a memory sub-entity that consist entirely of these "idle" communications are the equivalent of the memory sub-entity being empty, and hence likewise serve as an indication that the sub-entity's (real) contents have all been replaced. Such changes and modifications can be made without departing from the spirit and the scope of the invention and without diminishing its attendant advantages. It is therefore intended that all such changes and modifications be covered by the following claims.

We claim:

1. An arrangement for determining that the contents of two memories have become synchronized in a duplicated-memory apparatus that includes the two memories and that further includes a memory-update arrangement which responds to receipt by the duplicated-memory apparatus of information by writing the received information into both of the memories, comprising:

selectively activatable means for monitoring, upon activation of said monitoring means, the supplanting of the contents, that exist at the time of the activation of said monitoring means in an active one of the two memories, by the received information which is being written into both of the memories, to determine when the contents that existed in the active memory at the time when the monitoring means were activated have all been supplanted by the received information; and means cooperative with the monitoring means for indicating that the contents that existed in the active memory at the time when the monitoring means were activated, have all been supplanted by the received information, thereby signalling that the contents of the two memories have become synchronized.

2. The arrangement of claim 1 wherein the monitoring means include means for clearing the contents of the other one of the two memories upon activation of the monitoring means.

3. The arrangement of claim 1 wherein the receipt of the information by the duplicated-memory apparatus results from normal use of the active memory for its intended application.

4. The arrangement of claim 1 further comprising means for reactivating the monitoring mean in response to deletion of information, that occurs while the monitoring means are active, due to overflow of data, in an active one of the two memories.

5. An arrangement for determining that the contents of two memories have become synchronized in a duplicated-memory apparatus that includes the two memories wherein each memory implements at least one queue for buffering the received information, and that further includes a memory-update arrangement which responds to receipt of information, destined for an individual queue, by the duplicate-memory apparatus, by writing the received information into the individual queue in each memory, the apparatus includes a memory read-out arrangement for removing, from individual queues of both memories, information that has been written into the individual queues, and the apparatus further includes at leas tone queue-length indicator each corresponding to a different at least one queue in the active memory and indicating an amount of information stored in the corresponding at least one queue, comprising:

selectively activatable means for monitoring, upon activation of said monitoring means, individual ones of the queuelength indicators for an indication that the corresponding at least one queue has been emptied since the time when the monitoring means were activated; and means cooperative with the monitoring means for indicating when every queue-length indicator has indicated that its corresponding queue has been emptied since the time when the monitoring mean were activated, thereby signalling that the contents of the two memories are synchronized.

6. The arrangement of claim 5 wherein:

the monitoring means monitor queue-length indicators for an indication that the corresponding at least one queue has been emptied of one of either (a) all information or (b) information that was stored therein at the tim of activation of the monitoring means, since the time when the monitoring means were activated.

7. An arrangement for synchronizing contents of two memories in a duplicate-memory apparatus, comprising:

means responsive to receipt of information by the duplicated-memory apparatus, for writing the received information into both memories; and selectively activatable means for monitoring, upon activation of said monitoring means, the supplanting of the contents, that exist at the time of the activation of said monitoring means in an active one of the two memories, by the received information which is being written into both of the memories, to determine when the contents that existed in the active memory at the time when the monitoring means were activated have all been supplanted by the received information, and for indicating that the contents, that existed in the active memory at the time when the monitoring means were activated, have all been supplanted, thereby signalling that both memories now have duplicate contents.

8. The arrangement of claim 7 wherein the monitoring means include means for clearing the contents of the other one of the two memories upon activation of the monitoring means.

9. The arrangement of claim 7 wherein the receipt of the information by the duplicated-memory apparatus results from normal use of the active memory for its intended application.

10. The arrangement of claim 7 wherein the writing means include means for deleting information, in response to overflow of the active one of the memories; and the arrangement further comprising means for reactivating the monitoring means in response to the deletion that occurs while the monitoring means are active.

11. An arrangement for synchronizing contents of two memories in a duplicated-memory apparatus wherein each memory implements at least one queue for buffering the received information, comprising:

means responsive to receipt of information, destined for an individual queue, by the duplicated-memory apparatus, for writing the received information into the individual queue in each memory;

means for removing, from individual queues of both memories, information that has been written into the individual queues;

at least one queue-length indicator, each corresponding to a different at least one queue in the active memory, for indicating an amount of information stored in the corresponding at least one queue, and selectively activatable means for monitoring, upon activation of said monitoring means, individual ones of the queue-length indicators for an indication that the corresponding at least one queue has been emptied since the time when the monitoring means were activated, and for indicating when every queue-length indicator has indicated that its corresponding at least one queue has been emptied since the time when the monitoring means were activated, thereby signalling that both memories now have duplicated contents.

12. The arrangement of claim 11 wherein:

the monitoring means monitor queue-length indicators for an indication that the corresponding at least one queue has been emptied of one of either (a) all information or (b) information that was stored therein at the time of activation of the monitoring means, since the time when the monitoring means were activated.

13. An arrangement comprising:
an active memory that includes contents;
a standby memory for selective use in lieu of the active memory, when the standby memory has same contents as the active memory;
means responsive to receipt of information, for writing the received information into both memories; and
selectively activatable means for monitoring, upon activation of said monitoring means, the supplanting of the contents, that exist at the time of the activation of said monitoring means in an active one of the two memories, by the received information which is being written into both of the memories, to determine when the contents that existed in the active memory at the time when the monitoring means were activated have all been supplanted by the received information, and for indicating that the contents, that existed in the active memory at the time when the monitoring means were activated, have all been supplanted by the received information, thereby signalling that both memories now have the same contents.

14. The arrangement of claim 13 wherein the monitoring means include
means for clearing the contents of the standby memory upon activation of the monitoring means.

15. The arrangement of claim 13 wherein the receipt of the information by the arrangement results from normal use of the active memory for its intended application.

16. The arrangement of claim 13 wherein
the writing means include means for deleting information, in response to overflow of the active memory; and
the arrangement further comprising
means for reactivating the monitoring means in response to the deletion that occurs while the monitoring means are active.

17. An arrangement comprising:
an active memory that includes contents;
a standby memory for selective use in lieu of the active memory, when the standby memory has same contents as the active memory;
each memory implementing at least one queue for buffering the received information;
means responsive to receipt of information, destined for an individual queue, by the arrangement, for writing the received information into the individual queue in each memory;
means for selectively removing, from individual queues of both memories, information that has been written into the individual queues;
at least one queue-length indicator, each corresponding to a different at least one queue in the active memory, for indicating an amount of information stored in the corresponding at least one queue; and
selectively activable means for monitoring, upon activation of said monitoring means, individual ones of the queue-length indicators for an indication that the corresponding at least one queue has been emptied since the time when the monitoring means were activated, and for indicating when every queue-length indicator has indicated that its corresponding at least one queue has been emptied since the time when the monitoring means were activated, thereby signalling that both memories now have the same contents.

18. The arrangement of claim 17 wherein:
the monitoring means monitor queue-length indicators for an indication that the corresponding at least one queue has been emptied of one of either (a) all information or (b) information that was stored therein at the time of activation of the monitoring means, since the time when the monitoring means were activated.

19. A method of determining that the contents of two memories have been synchronized in a duplicated-memory apparatus, comprising the steps of:
writing the information into both memories, in response to each receipt of information by the apparatus;
activating monitoring of the supplanting of the contents, that exist at the time of the activation of said monitoring means in an active one of the two memories, by the received information which is being written into both of the memories, to determine when the contents that existed in the active memory at the time when the monitoring was activated have all been supplanted by the received information; and
in response to the monitoring, indicating that the contents of the active e memory, that existed when the monitoring was activated, have all been supplanted by the received information, to signal that both memories now have the same contents.

20. The method of claim 19 wherein the stp of activating monitoring includes the step of
clearing the contents of a standby one of the memories.

21. The method of claim 19 wherein the receipt of the information by the apparatus results from normal use of the active memory for its intended application.

22. The method claim 19 further comprising the steps of:
deleting information, in response to overflow of the active memory; and
reactivating the monitoring of the replacement, in response to the deletion.

23. A method of determining that the contents of two memories have been synchronized in a duplicated-memory apparatus wherein each memory implements at least one queue for buffering the received information and the apparatus further includes at least one queue-length indicator each corresponding to a different at least one queue in the active memory and indicating an amount of information stored in the corresponding at least one queue, comprising the steps of:
in response to each receipt of information, destined for an individual queue, by the apparatus, writing the received information into the individual queue in each memory and incrementing the corresponding queue-length indicator;
selectively removing, from individual queues of both memories, information that has been written into the individual queues and decrementing the corresponding queue-length indicators;
commencing to monitor individual ones of the queue-length indicators for an indication that the corresponding at least one queue has been emptied; and
in response to the monitoring, indicating that every queue-length indicator has indicated that its corresponding at least one queue has been emptied since the time when the monitoring was commenced, to signal that the contents of the two memories are synchronized.

24. A method of determining that the contents of two memories have been synchronized in a duplicated-memory apparatus wherein each memory implements at least one queue for buffering the received information and the apparatus further includes at least one queue-length indicator each corresponding to a different at least one queue in the active memory and indicating an amount of information stored in the corresponding at least one queue, comprising the steps of:

in response to each receipt of information, destined for an individual queue, by the apparatus, writing the received information into the individual queue in each memory;

in response to writing the received information into the individual queue in the active memory, incrementing the corresponding queue-length indicator;

selectively removing, from individual queues of both memories, information that has been written into the individual queues and decrementing the corresponding queue-length indicators;

ceasing to increment the queue-length indicators and commencing to monitor individual ones of the queue-length indicators for an indication that the corresponding at least one queue has been emptied; and in response to the monitoring, indicating that every queue-length indicator has indicated that its corresponding at least one queue has been emptied since the monitoring was commenced, to signal that the contents of the two memories are synchronized.

* * * * *